Figure 1:
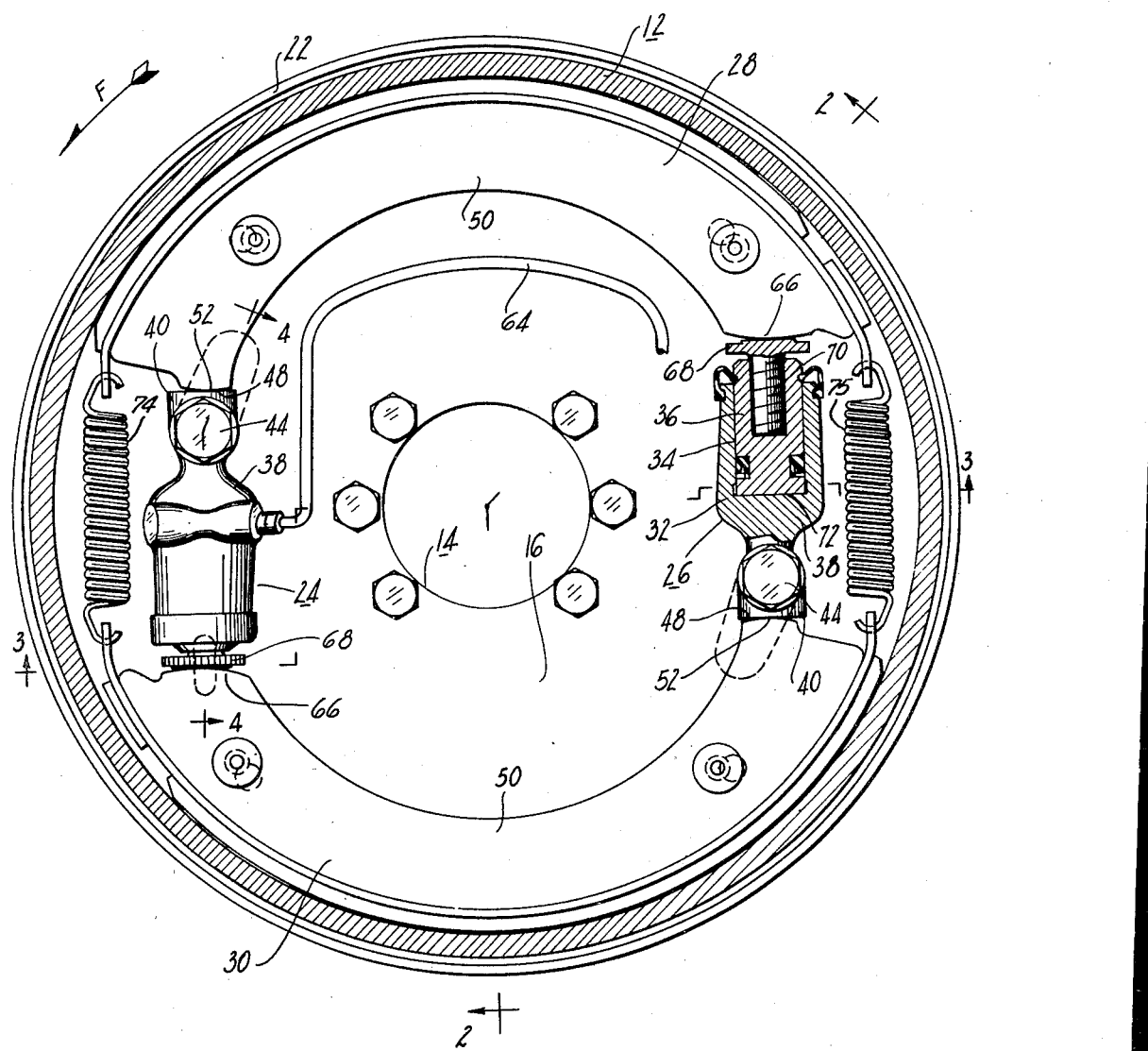

INVENTOR.
JOSEPH L. MOSSEY

Jan. 17, 1950  J. L. MOSSEY  2,495,074
FLUID PRESSURE BRAKE MOUNTING
Filed Oct. 25, 1947  2 Sheets-Sheet 2
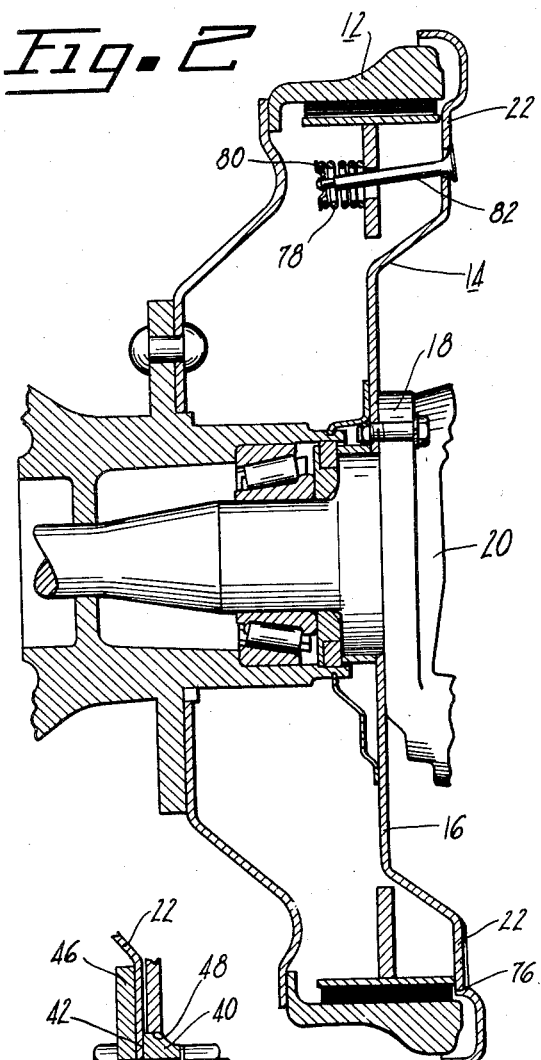
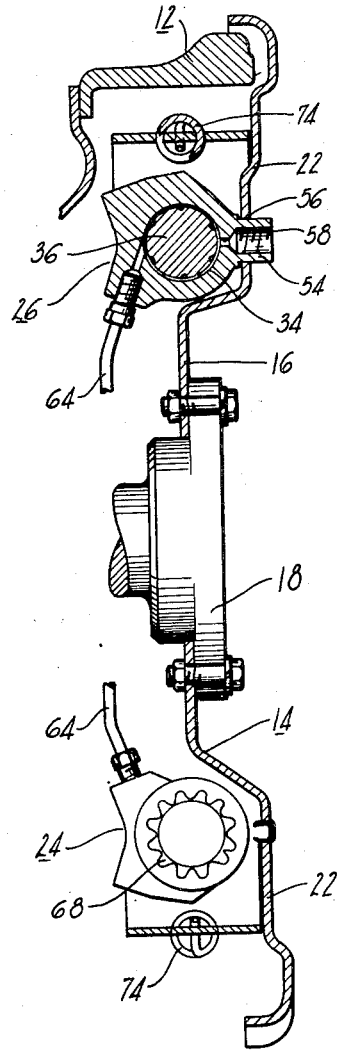
INVENTOR.
JOSEPH L. MOSSEY
BY
T. J. Plante
ATTORNEY Patented Jan. 17, 1950

2,495,074

UNITED STATES PATENT OFFICE 2,495,074

FLUID PRESSURE BRAKE MOUNTING

Joseph L. Mossey, South Bend, Ind., assignor to Bendix Aviation Corporation, South Bend, Ind., a corporation of Delaware Application October 25, 1947, Serial No. 782,178

14 Claims. (Cl. 188—152)

This invention relates to improvements in the construction and arrangement of brakes, particularly of the type in which one or two single-acting hydraulic actuators are used.

House application Serial No. 674,772, filed June 6, 1946, discloses a brake having two single-acting, or one-way, wheel cylinders, each of which has a bore at one end containing a piston arranged to actuate one of the brake shoes, the other end of each actuator being closed and having a shoe-anchoring surface provided thereon. In said House application the two wheel cylinders are secured to the supporting plate by means of radially-extending mounting flanges.

The present invention provides a brake which is an improvement over that disclosed in the House application, the mounting flange of each of the hydraulic actuators being arranged to extend in a direction which is substantially axial with respect to the bore of the actuator and substantially tangential with respect to the brake as a whole. With this arrangement the mounting flange of each hydraulic actuator not only serves as a means for securing the actuator to the supporting plate, but it also provides an anchor surface which engages one end of one of the brake shoes.

Among the advantages of the present invention are the provision of additional space in the brake assembly, due to the fact that the mounting flange does not extend toward the axis of the brake, and the reduction, or elimination, of the moment arm of the shoe-anchoring force about the mounting bolt. Because of the latter advantage, only one mounting bolt is required for each wheel cylinder, whereas formerly either a plurality of mounting bolts were required, or one mounting bolt together with one or more nibs arranged to assist in taking the anchoring torque.

Other objects and advantages of the present invention will become apparent during the following description of an illustrative embodiment of the invention, reference being had therein to the accompanying drawings, in which:

Figure 1 is a side elevation of a brake assembly which incorporates the invention; and Figures 2, 3, and 4 are sections taken on the lines 2—2, 3—3, and 4—4, respectively, of Figure 1.

Referring to the drawings, my improved brake, which is intended to be used with a conventional brake drum 12, includes a support member, or supporting plate, 14 having a substantially flat oblong center portion 16 which is adapted to be secured by suitable means to the flange 18 of a steering knuckle 20, and having an integral axially-offset outer portion 22 which is arranged to serve as a closure for the open side of the drum 12. Two hydraulic actuators 24 and 26, and two T-section brake shoes 28 and 30 are mounted on the supporting plate 14.

The two hydraulic actuators are identical in construction, and therefore a description of one of them will suffice for both. The casing 32 of each actuator has a cylindrical bore 34 at one end, in which reciprocates a piston 36. The closed end 38 of each actuator has an intergral extension 40 which serves as the mounting flange of the actuator. In general, the mounting flange 40 can be said to extend in a direction which is axial with respect to the cylinder bore 34 and tangential with respect to the entire brake assembly. As shown in Figure 4, the mounting flange 40 lies against a surface 42 of the outer portion 22 of the supporting plate. An axially-extending (with respect to the brake assembly) mounting bolt 44 extends through apertures provided in the mounting flange and in the supporting plate to secure the hydraulic actuator to said plate. A reinforcing plate 46 may be mounted between the head of bolt 44 and the supporting plate.

The outer end, or edge, of mounting flange 40 provides a flat, substantially radially extending shoe-anchoring surface 48. In the illustrated version of the brake the surface 48 is parallel to the horizontal center line of the brake assembly. The strengthening webs 50 of the brake shoes 28 and 30 are each provided with a convexly-curved end surface 52 which engages the shoe-anchoring surface 48 of the respective mounting flange. As is apparent from Figure 1, the anchoring point of each shoe web is on or near the extended axis of the respective hydraulic actuator. Therefore, when the shoes anchor, their anchoring torque has little or no moment arm tending to rotate the hydraulic actuator about the mounting bolt 44. With this arrangement only a single mounting bolt is required for each hydraulic actuator. Additional support for the actuator is provided by a boss 54 which extends laterally from the actuator through an opening 56 in the outer portion 22 of the supporting plate. Engagement of boss 54 with the aperture 56 prevents rotation of the actuator about the axis of the mounting bolt. The boss of each actuator is provided with a threaded opening 58 which leads to the inner end of bore 34. As shown in Figure 4, the threaded opening 58 in the boss of hydraulic actuator 24 has a bleeder screw 60 mounted therein. The threaded opening 58 in the boss of hydraulic actuator 26 is adapted to be connected to a hose, or conduit, which leads to the master cylinder. Inter-communication between hydraulic actuators 24 and 26 is provided by a conduit 84.

In order to avoid offset loading of supporting plate 14, it is preferred that the axes of the hydraulic actuators be in the plane of the center portion 16 of the supporting plate, as shown, and that the strengthening webs 50 of the brake shoe also lie in the plane of the center portion 16 of the supporting plate. However, the utility of the invention is in no way limited to a brake incorporating such an arrangement.

The applying ends 66 of the shoes, which are remote from the anchoring ends 52, are also convexly-curved, and engage the heads 68 of adjusting screws which have their stems 70 screwed into the pistons 36. Released position of the applying ends of the shoes is determined by the engagement of the pistons 36 with the inner walls 72 of the respective cylinders. The shoes are biased to released position by means of return springs 74 and 75, each of which is connected in tension between the applying end of one shoe and the anchoring end of the other shoe. Lateral guiding of the shoes is provided by engagement of their rims with ledges 76 provided on the outer portion 22 of the supporting plate, the shoes being resiliently held in engagement with the ledges by means of hold-down springs 78 compressed between the webs of the shoes and collars 80 mounted on pins 82, which are anchored on the supporting plate.

The mode of operation of the brake should be obvious from the foregoing description. When fluid under pressure is transmitted from the usual master cylinder to the hydraulic actuators 24 and 26, the pistons 36 act on the applying ends 66 of the respective shoes to force the shoes into engagement with the drum. Assuming that the drum is rotating in a forward direction, as indicated by the arrow F in Figure 1, both of the shoes will be self-energizing, and their anchoring torque will be transmitted through the mounting flanges 40 to the supporting plate.

Although a particular embodiment of my invention has been described, it will be understood by those skilled in the art that the object of the invention may be attained by the use of constructions different in certain respects from that disclosed without departing from the underlying principles of the invention.

I claim:

1. A brake, for use in cooperation with a rotatable drum, comprising a supporting plate having a substantially flat center portion adapted to be secured to a non-rotating member and an integral axially offset outer portion adapted to serve as a closure for the open side of the drum, said outer portion having at each of two substantially diametrically opposed locations two angularly-spaced openings, one of which is provided to accommodate a fastening member, and the other of which is provided to accommodate an actuator boss, two hydraulic actuators located at opposite sides of the brake and each comprising a casing closed at one end and having a cylindrical bore at its open end which is on an axis lying in the plane of the center portion of the supporting plate, the closed end of each actuator having an integral mounting flange which extends substantially axially with respect to the bore of the actuator and substantially tangentially with respect to the brake as a whole and which lies against the outer portion of the supporting plate, two axially extending fastening members, one extending through the flange of each of the actuators and through the corresponding opening in the outer portion of the supporting plate, the outer edge of the flange of each actuator providing a substantially radially extending shoe-anchoring surface, each actuator having a laterally extending boss which extends through the corresponding opening in the outer portion of the supporting plate, a single piston reciprocable in the cylindrical bore of each actuator, two T-section shoes each having a strengthening web which lies in the plane of the center portion of the supporting plate, each of said shoe webs having convexly curved end surfaces, one of which engages the shoe-anchoring surface provided by the flange of one of the actuators and the other of which engages the piston in the other actuator, and return springs which urge the shoes toward retracted position.

2. A brake, for use in cooperation with a rotatable drum, comprising a supporting plate adapted to be secured to a non-rotating member and having at each of two substantially diametrically opposed locations two angularly-spaced openings, one of which is provided to accommodate a fastening member, and the other of which is provided to accommodate an actuator boss, two hydraulic actuators located at opposite sides of the brake and each comprising a casing closed at one end and having a cylindrical bore at its open end, the closed end of each actuator having an integral mounting flange which extends substantially axially with respect to the bore of the actuator and substantially tangentially with respect to the brake as a whole and which lies against the supporting plate, two axially extending fastening members, one extending through the flange of each of the actuators and through the corresponding opening in the supporting plate, the outer edge of the flange of each actuator providing a substantially radially extending shoe-anchoring surface, each actuator having a laterally extending boss which extends through the corresponding opening in the supporting plate, a single piston reciprocable in the cylindrical bore of each actuator, two T-section shoes each having a strengthening web which has convexly curved end surfaces, one of which engages the shoe-anchoring surface provided by the flange of one of the actuators and the other of which engages the piston in the other actuator, and return springs which urge the shoes toward retracted position.

3. A brake, for use in cooperation with a rotatable drum, comprising a supporting plate adapted to be secured to a non-rotating member and having at each of two substantially diametrically opposed locations two angularly-spaced openings, one of which is provided to accommodate a fastening member, and the other of which is provided to accommodate an actuator boss, two hydraulic actuators located at opposite sides of the brake and each comprising a casing closed at one end and having a cylindrical bore at its open end, the closed end of each actuator having an integral mounting flange which extends substantially axially with respect to the bore of the actuator and substantially tangentially with respect to the brake as a whole and which lies against the supporting plate, two axially extending fastening members, one extending through the flange of each of the actuators and through the corresponding opening in the supporting plate, the outer edge of the flange of each actuator providing a substantially radially extending shoe-anchoring surface, each actuator having a laterally extending boss which extends through the corresponding opening in the supporting plate, a single piston reciprocable in the cylindrical bore of each actuator, and two T-section shoes each having a strengthening web which engages at one end the shoe-anchoring surface provided by the flange of one of the actuators and at the other end the piston in the other actuator.

4. A brake, for use in cooperation with a rotatable drum, comprising a supporting plate adapted to be secured to a non-rotating member and having at each of two substantially diametrically opposed locations two angularly-spaced openings, one of which is provided to accommodate a fastening member, and the other of which is provided to accommodate an actuator boss, two hydraulic actuators located at opposite sides of the brake and each comprising a casing closed at one end and having a cylindrical bore at its open end, the closed end of each actuator having an integral mounting flange which extends substantially axially with respect to the bore of the actuator and substantially tangentially with respect to the brake as a whole and which lies against the supporting plate, two axially extending fastening members, one extending through the flange of each of the actuators and through the corresponding opening in the supporting plate, the outer edge of the flange of each actuator providing a substantially radially extending shoe-anchoring surface, each actuator having a laterally extending boss which extends through the corresponding opening in the supporting plate, a single piston reciprocable in the cylindrical bore of each actuator, and two T-section shoes each of which engages at one end the shoe-anchoring surface provided by the flange of one of the actuators and at the other end the piston in the other actuator.

5. A brake, for use in cooperation with a rotatable drum, comprising a supporting plate adapted to be secured to a non-rotating member, two hydraulic actuators located at opposite sides of the brake and each comprising a casing closed at one end and having a cylindrical bore at its open end, the closed end of each actuator having an integral mounting flange which extends substantially axially with respect to the bore of the actuator and substantially tangentially with respect to the brake as a whole and which lies against the supporting plate, axially extending fastening members which secure the flanges of the actuators to the supporting plate, the outer edge of the flange of each actuator providing a substantially radially extending shoe-anchoring surface, a single piston reciprocable in the cylindrical bore of each actuator, and two T-section shoes each of which engages at one end the shoe-anchoring surface provided by the flange of one of the actuators and at the other end the piston in the other actuator.

6. A brake, for use in cooperation with a rotatable drum, comprising a supporting plate adapted to be secured to a non-rotating member, two hydraulic actuators located at opposite sides of the brake, each comprising a casing closed at one end and having a cylindrical bore at its open end, the closed end of each actuator having a portion extending thereform by means of which the actuator is secured to the supporting plate, an edge of the extending portion of each actuator providing a substantially radially extending shoe-anchoring surface, a single piston reciprocable in the bore of each actuator, and two brake shoes each of which engages at one end the shoe-anchoring surface provided by the extending portion of one of the actuators and at the other end the piston in the other actuator.

7. A brake, for use in cooperation with a rotatable drum, comprising a support member, two hydraulic actuators located at opposite sides of the brake, each being closed at one end and having a bore at its open end, the closed end of each actuator having a portion extending therefrom for securing the actuator to the supporting member, said extending portion being adapted to take the anchoring load of its companion brake shoe, a single piston reciprocable in the bore of each actuator, and two brake shoes each of which engages at one end the extending portion of one of the actuators and at the other end the piston in the other actuator.

8. A brake, for use in cooperation with a rotatable drum, comprising a support member, a hydraulic actuator which is closed at one end and which has a bore at its open end, the closed end of the actuator having an extending portion which is secured to the support member and which constitutes the sole means for securing the actuator to the support member, the outer edge of the extending portion of the actuator providing a shoe-anchoring surface, a single piston reciprocable in the bore of the actuator, and a brake shoe operatively associated with the piston.

9. A brake, for use in cooperation with a rotatable drum, comprising a support member, a hydraulic actuator which is closed at one end and which has a bore at its open end, the closed end of the actuator having an extending portion, the outer edge of the extending portion of the actuator providing a shoe-anchoring surface, fastening means securing the actuator to the support member and located between the actuator body and the shoe-anchoring surface, and a single piston reciprocable in the bore of the actuator.

10. A brake, for use in cooperation with a rotatable drum, comprising a support member, a hydraulic actuator which is closed at one end and which has a bore at its open end, the closed end of the actuator having an extending portion, the outer edge of the extending portion of the actuator providing a shoe-anchoring surface, and fastening means, securing the actuator to the support member and located between the actuator body and the shoe-anchoring surface.

11. A brake, for use in cooperation with a rotatable drum, comprising a supporting plate having a substantially flat center portion adapted to be secured to a non-rotating member and an integral axially offset outer portion adapted to serve as a closure for the open side of the drum, said outer portion having at each of two substantially diametrically opposed locations two angularly-spaced openings, one of which is provide to accommodate an actuator boss, and the other of which is provided to accommodate a fastening member, two hydraulic actuators located at opposite sides of the brake and each comprising a casing closed at one end and having a cylindrical bore at its open end, the closed end of each actuator having an extending portion, the outer edge of which provides a substantially radially extending shoe-anchoring surface, two fastening members, one located between the shoe-anchoring surface and the body of each actuator and entering one of the openings in the supporting plate to secure thereto the extending portion of the respective actuator, each actuator having a laterally extending boss which extends through the corresponding opening in the supporting plate, a single piston reciprocable in the cylindrical bore of each actuator, two T-section shoes each having a strengthening web, which engages at one end the shoe-anchoring surface provided by the extending portion of one of the actuators and at the other end the piston in the other actuator, and return springs which urge the shoes toward retracted position.

12. A brake, for use in cooperation with a rotatable drum, comprising a supporting plate adapted to be secured to a non-rotating member, two hydraulic actuators located at opposite sides of the brake and each comprising a casing closed at one end and having a cylindrical bore at its open end, the closed end of each actuator having an integral mounting portion which extends substantially axially with respect to the bore of the actuator and which lies against the supporting plate, axially extending fastening members which secure the mounting portions of the actuators to the supporting plate, the mounting portion of each actuator providing a substantially radially extending shoe-anchoring surface, a single piston reciprocable in the cylindrical bore of each actuator, and two T-section shoes each of which engages at one end the shoe-anchoring surface provided by the mounting portion of one of the actuators and at the other end the piston in the other actuator.

13. A brake, for use in cooperation with a rotatable drum, comprising a supporting plate adapted to be secured to a non-rotating member, two hydraulic actuators located at opposite sides of the brake and each comprising a casing closed at one end and having a cylindrical bore at its open end, the closed end of each actuator having an integral mounting portion which extends substantially tangentially with respect to the brake as a whole and which lies against the supporting plate, axially extending fastening members which secure the mounting portions of the actuators to the supporting plate, the mounting portion of each actuator providing a substantially radially extending shoe-anchoring surface, a single piston reciprocable in the cylindrical bore of each actuator, and two T-section shoes each of which engages at one end the shoe-anchoring surface provided by the mounting portion of one of the actuators and at the other end the piston in the other actuator.

14. A brake, for use in cooperation with a rotatable drum, comprising a supporting plate adapted to be secured to a non-rotating member and having at each of two substantially diametrically opposed locations two angularly-spaced openings, one of which is provided to accommodate a fastening member, and the other of which is provided to accommodate an actuator boss, two hydraulic actuators located at opposite sides of the brake and each comprising a casing closed at one end and having a cylindrical bore at its open end, the closed end of each actuator having an extending portion, the outer edge of which provides a shoe-anchoring surface, two fastening members, one located between the shoe-anchoring surface and the body of each actuator and entering one of the openings in the supporting plate to secure thereto the extending portion of the respective actuator, each actuator having a laterally extending boss which extends through the corresponding opening in the supporting plate, a single piston reciprocable in the cylindrical bore of each actuator, two shoes each of which engages at one end the shoe-anchoring surface provided by the extending portion of one of the actuators and at the other end the piston in the other actuator.

JOSEPH L. MOSSEY.

REFERENCES CITED

The following references are of record in the file of this patent:

UNITED STATES PATENTS

| Number | Name | Date |
| --- | --- | --- |
| 2,041,463 | Frank | May 19, 1936 |
| 2,122,296 | Russell | June 28, 1938 |
| 2,155,207 | Stocker | Apr. 18, 1939 |
| 2,192,293 | Waseige | Mar. 5, 1940 |
| 2,316,450 | Parnell | Apr. 13, 1943 |